(12) United States Patent
Choi et al.

(10) Patent No.: US 8,789,111 B2
(45) Date of Patent: Jul. 22, 2014

(54) SIGNAL PROCESSING APPARATUS, SIGNAL PROCESSING SYSTEM INCLUDING THE SAME, AND CONTROL METHOD OF THE SAME

(71) Applicant: Samsung Electronics Co., Ltd., Suwon-si (KR)

(72) Inventors: Seung-hyuk Choi, Suwon-si (KR); Seung-seop Shim, Anyang-si (KR); Moon-seok Han, Suwon-si (KR); Joon-hyuk Ryu, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/735,491

(22) Filed: Jan. 7, 2013

(65) Prior Publication Data

US 2013/0125173 A1    May 16, 2013

Related U.S. Application Data

(63) Continuation of application No. 11/943,896, filed on Nov. 21, 2007, now Pat. No. 8,407,740.

(30) Foreign Application Priority Data

Jul. 4, 2007   (KR) .................. 10-2007-0067020

(51) Int. Cl.
*H04N 5/445*   (2011.01)
*H04N 21/431*  (2011.01)
*H04N 21/462*  (2011.01)
*H04N 21/482*  (2011.01)

(52) U.S. Cl.
CPC ......... *H04N 21/431* (2013.01); *H04N 21/4622* (2013.01); *H04N 21/482* (2013.01)

USPC ............ 725/51; 725/50; 725/109; 725/110; 725/112

(58) Field of Classification Search
CPC   H04N 21/431; H04N 21/4622; H04N 21/482
USPC .............................. 725/51, 110, 112, 50, 109
See application file for complete search history.

(56) References Cited

U.S. PATENT DOCUMENTS 6,813,639 B2 * 11/2004 Nobakht et al. ............ 709/227
7,506,066 B2    3/2009 Nobakht et al.

(Continued)

FOREIGN PATENT DOCUMENTS

CN   1750637 A   3/2006
CN   1864408 A   11/2006

(Continued)

OTHER PUBLICATIONS

Office Action dated Jun. 7, 2011 from the State Intellectual Office of P.R. China in counterpart Chinese application No. 2008810090148.3.

(Continued)

*Primary Examiner* — Pankaj Kumar
*Assistant Examiner* — Timothy Newlin
(74) *Attorney, Agent, or Firm* — Sughrue Mion, PLLC

(57) ABSTRACT

A signal processing apparatus is provided. The signal processing apparatus includes: a memory unit in which a plurality of channels and Internet addresses corresponding to the channels are stored; a network connecting unit which is connectable to the Internet; and a control unit which controls the network connecting unit to connect to an Internet address corresponding to a channel selected by a user and to receive content provided from the connected Internet address.

21 Claims, 6 Drawing Sheets

(56) References Cited

U.S. PATENT DOCUMENTS

| | | | |
|---|---|---|---|
| 8,196,170 B2 | 6/2012 | Jun | |
| 2002/0144289 A1* | 10/2002 | Taguchi et al. | 725/112 |
| 2003/0093804 A1* | 5/2003 | Chang et al. | 725/95 |
| 2006/0184978 A1* | 8/2006 | Casey | 725/87 |
| 2006/0218608 A1 | 9/2006 | Miura et al. | |
| 2007/0100836 A1 | 5/2007 | Eichstaedt et al. | |
| 2007/0143796 A1* | 6/2007 | Malik | 725/51 |
| 2007/0162945 A1* | 7/2007 | Mills | 725/119 |
| 2009/0138924 A1* | 5/2009 | Eastes | 725/109 |

FOREIGN PATENT DOCUMENTS

| | | |
|---|---|---|
| EP | 1624694 A1 | 7/2005 |
| GB | 2 410 145 A | 7/2005 |
| KR | 20030019307 A | 3/2003 |
| KR | 1020060116858 A | 11/2006 |
| KR | 1020070047074 A | 5/2007 |
| WO | 02/097997 A2 | 12/2002 |

OTHER PUBLICATIONS

Communication dated Jul. 2, 2012 issued by the State Intellectual Property Office of P.R. China in counterpart Chinese Application No. 200810090148.3.

Communication dated Jun. 19, 2013 issued by the State Intellectual Property Office of P.R. China in counterpart Chinese Application No. 200810090148.3.

Communication dated Jul. 31, 2013 issued by the Korean Intellectual Property Office in counterpart Korean Application No. 1020070067020.

Communication dated Jan. 5, 2013, issued by the State Intellectual Property Office of the P.R.China in counterpart Chinese Application No. 200810090148.3.

* cited by examiner

SIGNAL PROCESSING APPARATUS, SIGNAL PROCESSING SYSTEM INCLUDING THE SAME, AND CONTROL METHOD OF THE SAME

CROSS-REFERENCE TO RELATED APPLICATIONS

This application is a Continuation of U.S. application Ser. No. 11/943,896 filed Nov. 21, 2007, which claims priority from Korean Patent Application No. 10-2007-0067020, filed on Jul. 4, 2007 in the Korean Intellectual Property Office, the disclosures of which are incorporated herein by reference.

BACKGROUND OF THE INVENTION

1. Field of the Invention

The present invention relates to a signal processing apparatus, a signal processing system including the same, and a control method of the same, and more particularly, to a signal processing apparatus which can access the Internet through channel tuning, a signal processing system including the same, and a control method of the same.

2. Description of the Related Art

Recently, with development of ultra-high speed communications network, there is an increased demand for accessing the Internet through a signal processing apparatus such as a digital television which receives a broadcast signal.

Such a signal processing apparatus having an Internet access function may be provided as a set top box which is connected to a television, or may be provided as a television which has a communication module provided therein. The signal processing apparatus may be communicably linked to a telephone line, a local area network (LAN), a high speed exclusive line, or the like.

Here, a user enters an Internet address of a desired website through a remote controller or a wireless keyboard to access the website. The user may access the website through favorites menu.

However, because there are an extremely large number of websites in the Internet compared with general broadcast channels, it is necessary to manage the websites so that the user can search for and access the websites conveniently.

Particularly, it is required to provide a technical environment for conveniently receiving, selecting and playing contents of a subscription type which is updated regularly, such as Really Simple Syndication or Rich Site Summary (RSS).

SUMMARY OF THE INVENTION

The present invention provides a signal processing apparatus which can allocate Internet addresses which provide contents according to user's selection to a plurality of channels and can allow a user to conveniently select desired content by channel tuning, a signal processing system including the same, and a control method of the same.

The present invention also provides a signal processing apparatus which can generate and provide an electronic program guide (EPG) information on received contents and allow a user to conveniently search for information on content provided from a desired Internet address, a signal processing system including the same, and a control method of the same.

The present invention also provides a signal processing apparatus which can provide a plurality of sub channels for a main channel and can select and play user desired content only or continuously play a plurality of contents, a signal processing system including the same, and a control method of the same.

According to an aspect of the present invention, there is provided a signal processing apparatus comprising: a memory unit to store therein a plurality of channels and Internet addresses corresponding to the channels; a network connecting unit which is connectable to the Internet; and a control unit which controls the network connecting unit to connect to an Internet address corresponding to a channel selected by a user and to receive content provided from the connected Internet address.

The control unit may allocate an Internet address selected by the user to the channel selected by the user among the plurality of channels.

The control unit may change the channels stored in the memory unit and the Internet addresses corresponding to the channels according to user's selection.

The signal processing apparatus may further comprise a user interface (UI) generating unit which generates at least a UI which comprises a menu for selecting an empty channel among the plurality of channels and a menu for selecting a presently connected Internet address or for entering an arbitrary Internet address, wherein the control unit stores in the memory unit the channel selected through the UI generating unit and the Internet address allocated to the selected channel.

The signal processing apparatus may further comprise a user input unit through which user's command for selecting the channel is input.

The signal processing apparatus may further comprise a display unit which displays the received contents.

The signal processing apparatus may further comprise an electronic program guide (EPG) generating unit which generates EPG information on the received contents, wherein the control unit controls the display unit to display the EPG information generated through the EPG generating unit.

The EPG information may include brief information on the contents, and the control unit controls the display unit to display the EPG information generated through the EPG generating unit.

The Internet address may be provided as RSS format.

The channel may comprise a main channel and a plurality of sub channels, and the control unit allocates to the plurality of sub channels, respectively, the Internet addresses which are allocated to the main channel and provide a plurality of contents.

The control unit may allocate to one of the plurality of sub channels an Internet address which continuously displays the contents allocated to the remaining sub channels.

According to another aspect of the present invention, there is provided a signal processing system comprising: a signal processing apparatus which comprises a memory unit to store therein a plurality of channels and Internet addresses corresponding to the channels, a network connecting unit which is connectable to the Internet, and a control unit which controls the network connecting unit to connect to an Internet address corresponding to a channel selected by a user and to receive content provided from the connected Internet address; and a server which allocates an Internet address selected by the user to the channel selected by the user among the plurality of channels and stores the Internet address in the memory unit.

According to another aspect of the present invention, there is provided a control method of a signal processing apparatus which comprises a memory unit to store therein a plurality of channels and Internet addresses corresponding to the channels and a network connecting unit which is connectable to the Internet, the control method comprising: selecting a channel by a user; and accessing to an Internet address corresponding to the selected channel and receiving contents provided from the Internet address.

The control method may further comprise: allocating an Internet address selected by the user to the channel selected by the user among the plurality of channels and storing the Internet address in the memory unit.

The control method may further comprise: generating at least a UI which comprises a menu for selecting an empty channel and a menu for selecting a presently connected Internet address or for entering an arbitrary Internet address.

The control method may further comprise: displaying the received contents.

The control method may further comprise: generating EPG information on the contents; and displaying the generated EPG information.

The EPG information may comprise brief information on the contents, and the control method may further comprise: displaying the brief information on the content selected by the user on a sub screen.

The channel may comprise a main channel and a plurality of sub channels, and Internet addresses of the plurality of contents provided from the Internet addresses which are allocated to the main channel may be allocated to the plurality of sub channels in the storing stage.

To one of the plurality of sub channels may be allocated an Internet address for continuously displaying contents allocated to the remaining sub channels.

BRIEF DESCRIPTION OF THE DRAWINGS

The above and/or other aspects of the present invention will become apparent and more readily appreciated from the following detailed description of the exemplary embodiments, taken in conjunction with the accompanying drawings, in which.

DETAILED DESCRIPTION OF EXEMPLARY EMBODIMENTS

Figure 1:
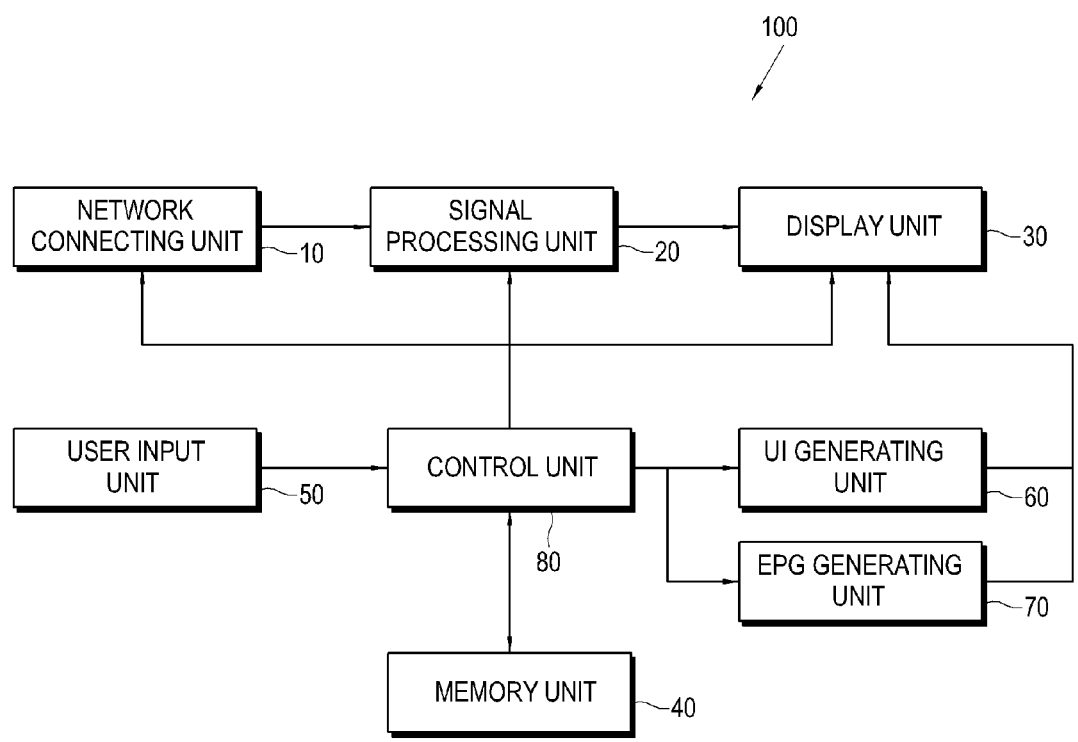
FIG. 1 is a block diagram illustrating a signal processing apparatus according to an exemplary embodiment of the present invention.

Reference will now be made in detail to the embodiments of the present invention, examples of which are illustrated in the accompanying drawings, wherein like reference numerals refer to like elements throughout. The exemplary embodiments are described below so as to explain the present invention by referring to the figures.

Referring to FIG. 1, a signal processing apparatus 100 according to an exemplary embodiment of the present invention includes a network connecting unit 10, a signal processing unit 20, a display unit 30, a memory unit 40, a user input unit 50, a user interface (UI) generating unit 60, an electronic program guide (EPG) generating unit 70, and a control unit 80.

The signal processing apparatus 100 may be provided as a display apparatus such as a digital television or a set top box. Alternatively, the signal processing apparatus 100 may be provided as a mobile device accessible to network such as a cellular phone, a personal computer, or the like.

The network connecting unit 10 includes a wired or wireless communication module (not shown) which can communicably access the Internet. The network connecting unit 10 connects to a certain Internet address and receives contents provided from the connected Internet address.

The contents provided from the connected Internet address may be of a syndication format which are regularly updated, distributed and subscribed, such as RSS.

The Internet address of the RSS format has an Extensible Markup Language (XML) type, and summarizes, shares and communicates various contents.

The RSS contents (or RSS feed) include contents and metadata. Each feed may include a headline of contents or a link to stories, or may include the entire contents of the concerned Internet website.

The RSS format may be expanded to a podcast which provides audio and video files, Outline Processor Markup Language (OPML), MediaRSS, or the like.

In this way, the network connecting unit 10 may be connected to an Internet address of a certain RSS format and receives content(s) provided from the Internet address.

Here, the Internet address may include a uniform resource locator (URL) of a hypertext markup language (HTML) type in addition to the RSS format.

The signal processing unit 20 processes a received broadcast signal including a video signal according to an output specification of the display unit 30, in which the broadcast signal is received through a signal receiving unit (not shown), in correspondence with one of a plurality of channels which is selected by a user.

Further, the signal processing unit 20 separates content identification information and data, etc. from received contents and processes them according to the output specification of the display unit 30.

For example, in the case of receiving contents of the RSS format including moving pictures, the signal processing unit 20 may include a demultiplexer (not shown) which separates a variety of additional data including text data, video data, audio data and metadata and outputs them in the form of bit streams, a video decoder (not shown) which decodes the separated video data, a scaler (not shown) which converts the decoded video signal to have vertical frequency, resolution, and picture ratio in correspondence with the output specification of the display unit 30.

The display unit 30 displays a broadcast signal and contents which are provided from an Internet address through the network connecting unit 10, which are processed through the signal processing unit 20.

The display unit 30 may be provided as a variety of display modules such as a Digital Light Processing (DLP) projector, a Liquid Crystal Display (LCD), a Plasma Display Panel (PDP), or the like.

The memory unit 40 stores therein a channel table 41 in which Internet addresses are allocated to a plurality of channels. The allocation and storage of the channels and Internet addresses will be described in detail later with reference to FIGS. 2 and 3.

The user input unit 50 inputs user's command for selecting the channel and Internet address.

The user input unit 50 may be provided as a button having a channel search function, a channel up/down key, a remote controller having numeral buttons, a front control panel of the signal processing apparatus 100, a controller which processes signals received from the above devices, or the like.

Figure 2:
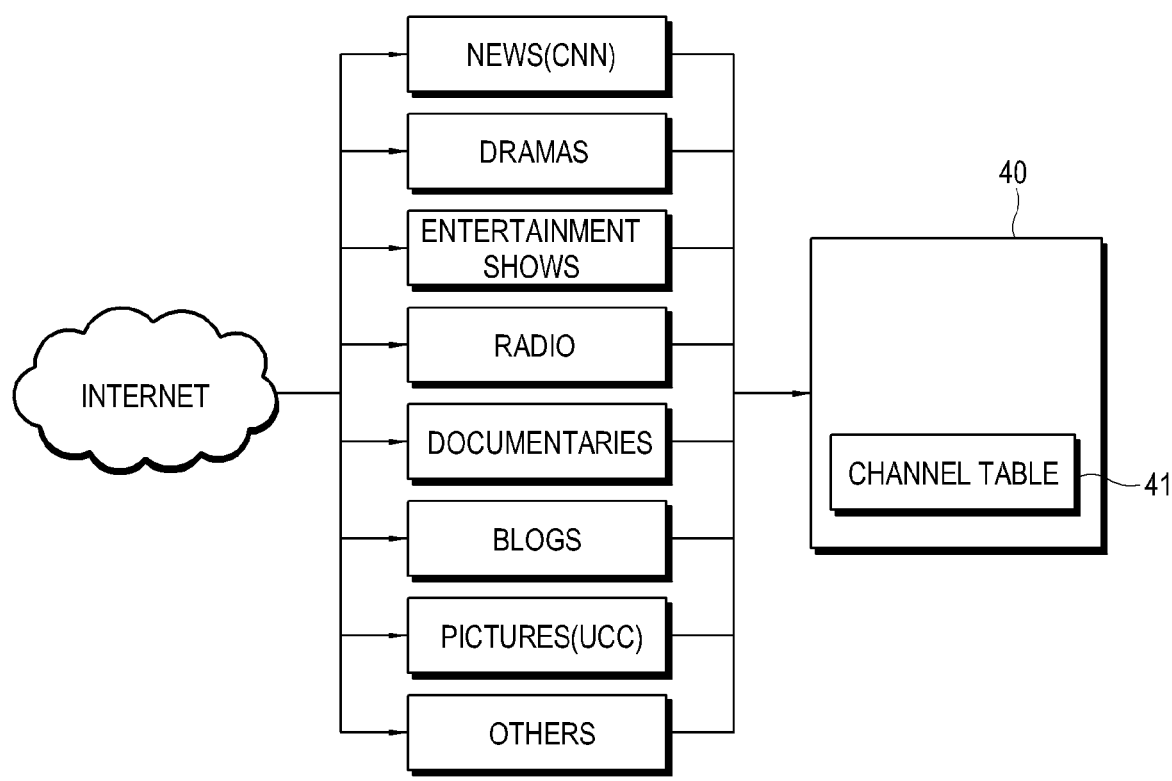
FIG. 2 and FIG. 3 illustrate an example of channel allocation according to an exemplary embodiment of the present invention.
Figure 3:
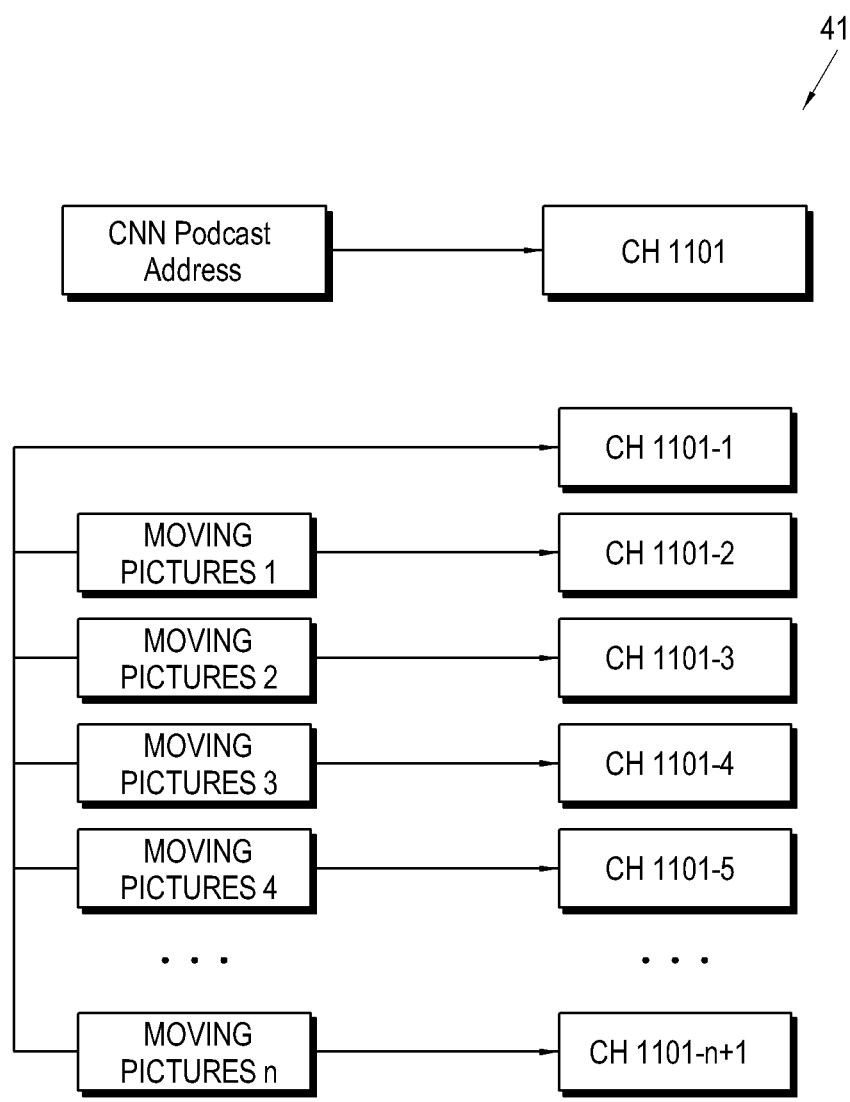

FIGS. 2 and 3 illustrate an example of channel allocation according to an exemplary embodiment of the present invention.

If various contents including news, dramas, entertainment shows, blogs, etc. are transmitted through the Internet, as shown in FIG. 2, the control unit 80 allocates an Internet address selected by a user to a channel selected through the user input unit 50 by the user and stores it in the channel table 41 of the memory unit 40.

Then, if the user selects a certain channel through the user input unit 50, the control unit 80 reads an Internet address corresponding to the selected channel from the memory unit 40 and controls the network connecting unit 10 to connect to the Internet address.

Thereafter, the contents provided from the connected Internet address are processed through the signal processing unit 20 and then displayed by the display unit 30.

The channel table 41 stored in the memory unit 40 includes at least a channel and an Internet address allocated thereto.

Each channel may include a main channel and a plurality of sub channels.

For example, referring to FIG. 3, if an Internet address is allocated to provide a CNN podcast as content through a channel 1101 (CH 1101), Internet addresses corresponding to moving pictures included in the content may be sequentially allocated to a plurality of sub channels 1101-2 (CH 1101-2) through 1101-$n$+1 (CH 1101-$n$+1) of the channel 1101 (CH 1101).

Here, an Internet address, which continuously provides moving picture contents allocated to the remaining sub channels, may be allocated to any one of the plurality of sub channels, for example, to the first sub channel (CH 1101-1).

Accordingly, if a user selects the sub channel (CH 1101-1), the display unit 30 sequentially plays the CNN podcast in the order of time.

Here, the channels may be designated by numerals, letters, or the like.

The UI generating unit 60 generates at least a UI which includes a menu for selecting an empty channel among the stored channels and a menu for selecting a presently connected Internet address or for entering an arbitrary Internet address, to the channel table 41 stored in the memory unit 40.

The UI may sequentially provide to a user at least a menu for selecting the empty channels in the channel table 41, and the user may select one among the empty channels to which the user wants to allocate the user's desired Internet address.

The control unit 80 stores information on the channel and Internet address selected as above in the channel table 41 of the memory unit 40.

As described above, because an Internet address selected by a user can be allocated to a channel selected by the user, channels can be separately registered according to the type of contents or selected according to the user's preference.

The control unit 80 may change the channels stored in the channel table 41 of the memory unit 40 and the Internet addresses allocated to the channels, according to the user's selection.

Further, the control unit 80 may read information on a channel table of another user, and store it in the memory unit 40 or edit it. Here, the control unit 80 may aggregate information on the plural channel tables 41 or selectively apply the channel tables 41.

The EPG generating unit 70 generates EPG information on the contents. For example, the content of the RSS format may include metadata which is a kind of additional information in addition to the content itself.

The EPG generating unit 70 generates the EPG information which includes brief information on a headline, a link to stories or a captured picture, using the metadata separated through the signal processing unit 20.

Particularly, if a user selects a certain channel, the control unit 80 receives metadata on content provided from an Internet address allocated to the channel selected through the network connecting unit 10, and the EPG generating unit 70 generates information on the selected channel and information on the content provided through the selected channel using the received metadata.

The control unit 80 displays the generated EPG information through the display unit 30.

Figure 4:
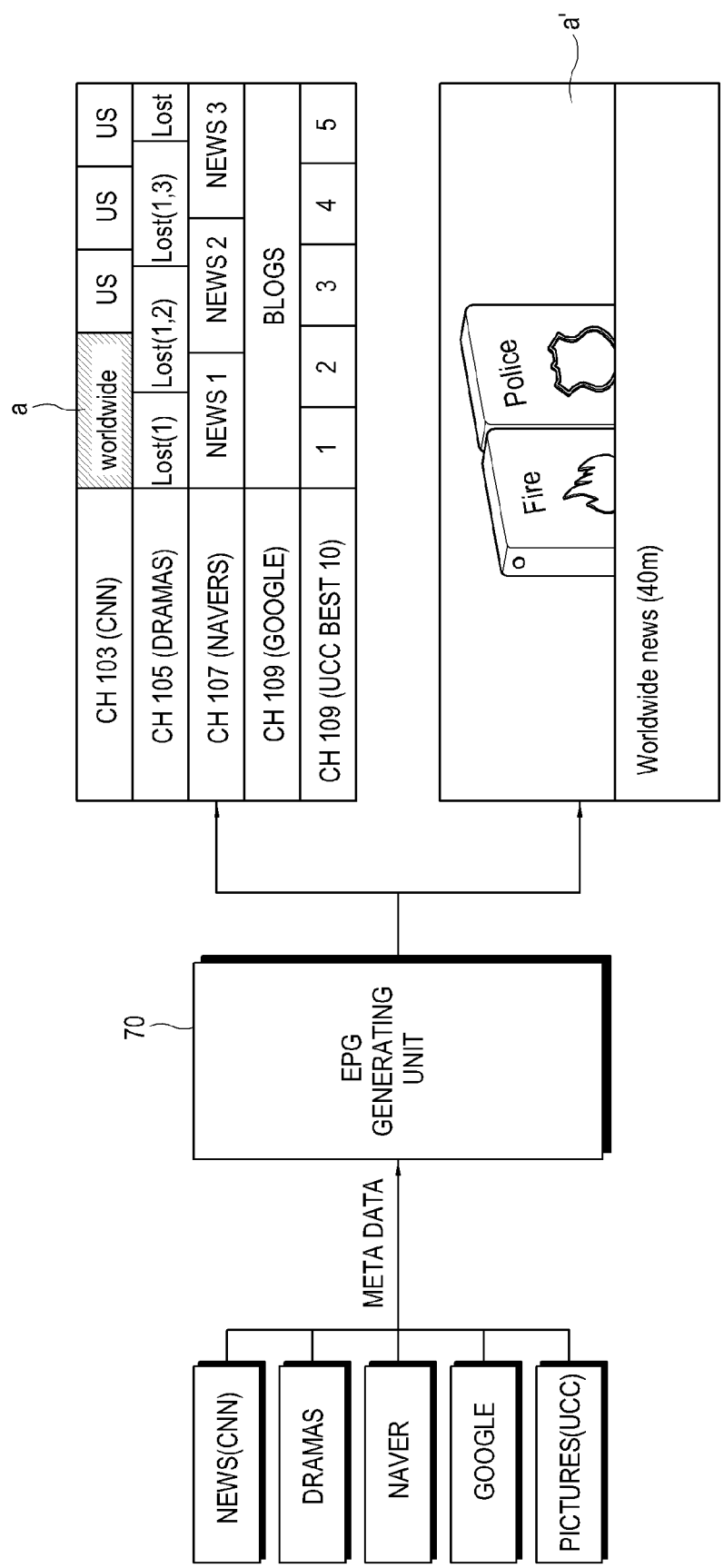
FIG. 4 illustrates an example of EPG information generated according to an exemplary embodiment of the present invention.

FIG. 4 illustrates an example of EPG information generated according to an exemplary embodiment of the present invention.

Referring to FIG. 4, the control unit 80 may sequentially display EPG information on the respective channels generated through the EPG generating unit 70 in the order of time, and further, may display brief information (a') on a selected content (a) on a sub screen.

Accordingly, a user can select his/her desired content among the received contents, easily obtain information on the content through EPG information on the selected content, and selectively view and/or listen to only the desired content.

Then, the user may store the received content in the memory unit 40, edit the content through the user input unit 50, and transmit the content to a portable mobile device such as a cellular phone, a personal digital assistant (PDA), or the like.

Figure 5:
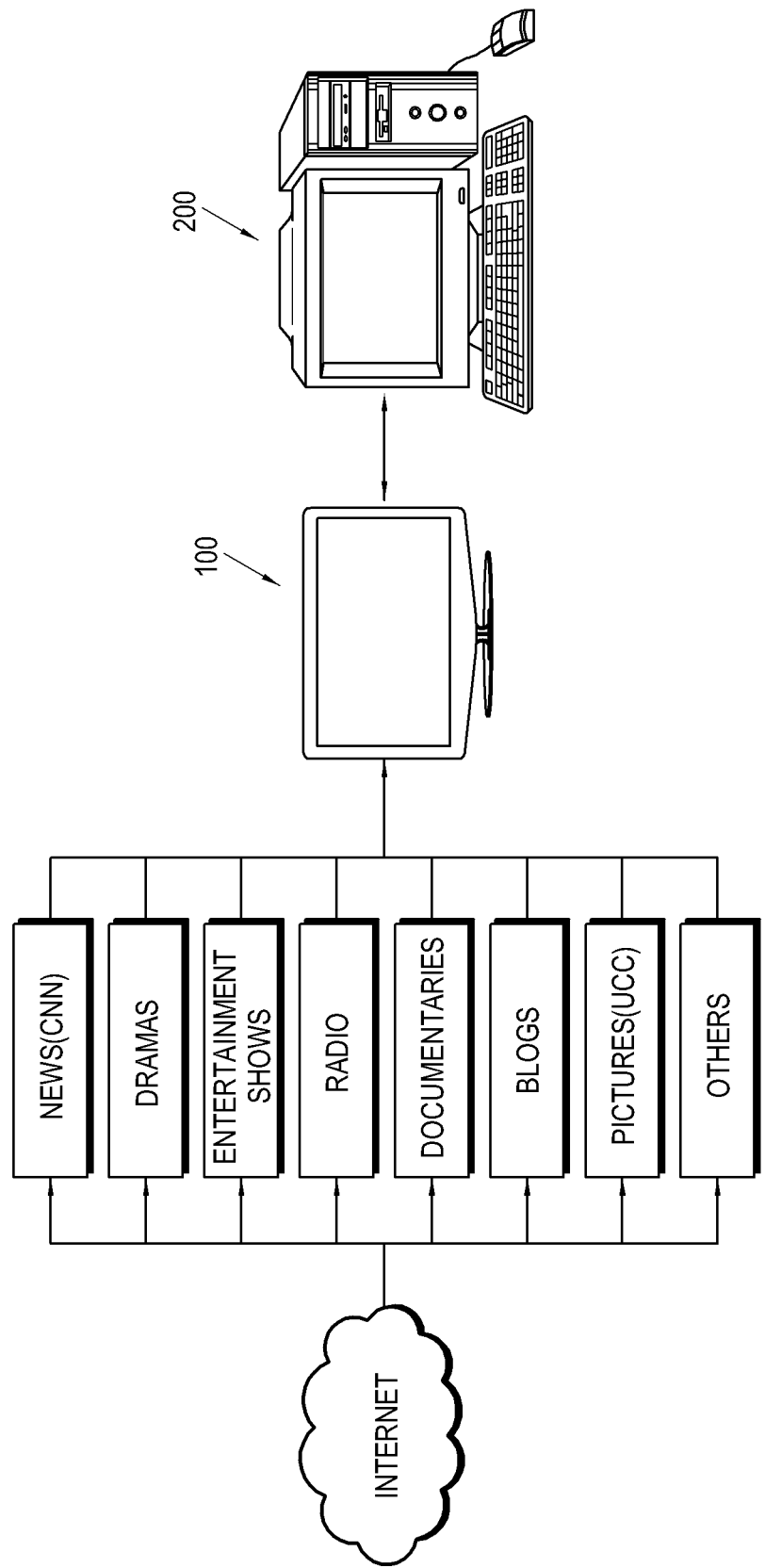
FIG. 5 is a block diagram illustrating a signal processing system according to an exemplary embodiment of the present invention.

Referring to FIG. 5, a signal processing system according to an exemplary embodiment of the present invention includes the signal processing apparatus 100 and a server 200 which is connectable to the signal processing apparatus 100.

The server 200 may be provided as a PC, a home server, or the like, and includes a communication module for connection with the signal processing apparatus 100.

The server 200 includes a user input unit such as a keyboard, a mouse, or the like, and a control unit such as a CPU, and allocates an Internet address selected by a user to a channel selected by the user through the user input unit and stores it.

Figure 6:
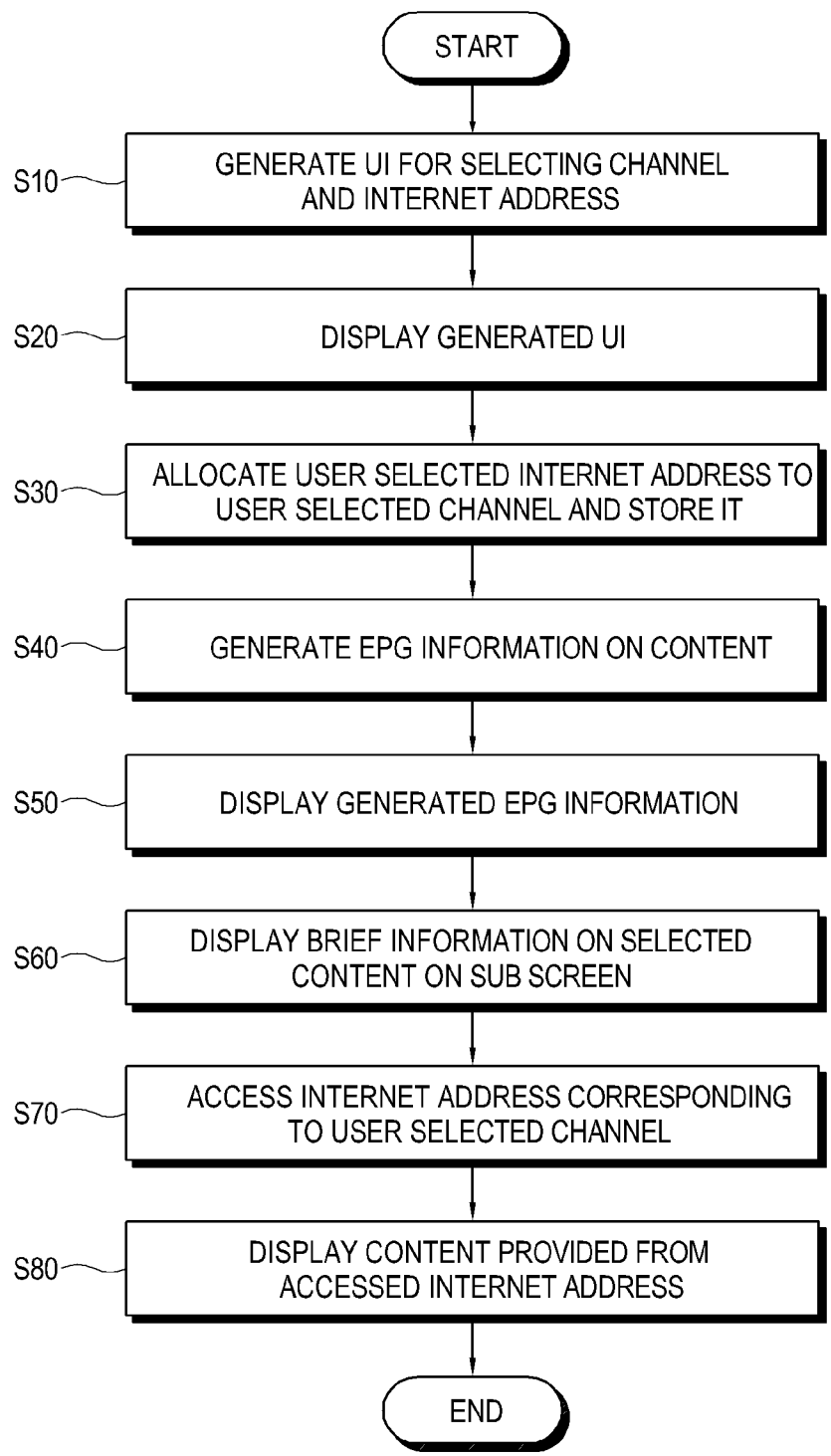
FIG. 6 is a flow chart illustrating a control method of a broadcast signal receiving apparatus according to an exemplary embodiment of the present invention.

Hereinafter, a control process of the signal processing apparatus 100 and the signal processing system 200 as above will be described with reference to FIG. 6.

First, the control unit 80 controls the UI generating unit 60 to generate at least one UI which includes a menu for selecting an empty channel among the channels stored in the memory unit 40 and a menu for selecting a presently connected Internet address or for entering an arbitrary Internet address (S10).

Then, the control unit 80 controls the display unit 30 to display the generated UI (S20).

Then, the control unit 80 allocates an Internet address selected by a user to a channel selected by the user through the user input unit 50 with respect to the generated UI, and stores it in the memory unit 40 (S30).

Here, the user may enter the presently connected Internet address or an arbitrary Internet address to the selected channel, through a menu of the displayed UI.

Here, the channel stored according to the user's selection may include one main channel and a plurality of sub channels, and the control unit 80 may allocate to the plurality of sub channels Internet addresses which are allocated to the main channel and provide a plurality of contents.

Further, the control unit 80 may allocate to one of the plurality of sub channels Internet addresses for continuously showing contents which are allocated to the remaining sub channels according to the user's selection.

Thereafter, the control unit 80 controls the EPG generating unit 70 to generate EPG information on the content provided from the Internet address (S40).

Then, the control unit 80 controls the display unit 30 to display the generated EPG information (S50).

Here, the EPG information may include brief information on the contents including a headline, a link to stories, a captured picture, or the like.

Then, the control unit 80 may control the display unit 30 to display brief information on a certain content selected by a user on a sub screen (S60).

Then, if the user selects an arbitrary channel through the user input unit 50, the control unit 80 reads an Internet address corresponding to the selected channel from the memory unit 40 and accesses the Internet address through the network connecting unit 10 (S70).

Here, the user may conveniently select desired content through the brief information on the content displayed in operation S60.

Then, the control unit 80 controls the display unit 30 to display the content including texts, moving pictures or the like which are provided from the Internet address connected through the network connecting unit 10 (S80).

As described above, according to the signal processing apparatus, the signal processing system and the control method thereof according to the exemplary embodiments of the present invention, Internet addresses which provide contents according to user's selection can be allocated to a plurality of channels, and thus, a user can conveniently see/hear his/her desired content through channel tuning.

Particularly, an Internet address selected by a user can be allocated to a channel selected by the user, and thus, channels can be separately registered according to the field of contents or can be selected according to user's preference.

Further, EPG information on received contents can be generated, and thus, a user can conveniently search for information on the content provided from a desired Internet address and can select and view and/or listen to desired content only.

In addition, the main channel may include the plurality of sub channels, and thus, only the user desired content can be selected and played, or a plurality of contents can be continuously played.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A signal processing apparatus comprising:
a memory unit in which a plurality of channels and internet addresses corresponding to the channels are stored;
a network connecting unit which is connectable to an internet; and
a control unit which controls the network connecting unit to connect to an internet address corresponding to a selected channel and to receive contents provided from the internet address;
a user interface (UI) generating unit which generates a UI which comprises a menu for selecting empty channels among the plurality of channels and a menu for selecting a presently connected internet address; and
a display unit which displays the generated UI,
wherein the control unit allocates an internet address selected by a user to the selected channel among the plurality of channels, and changes the channels stored in the memory unit and the internet addresses corresponding to the channels according to a selection by the user,
wherein the control unit stores in the memory unit the channel and the internet address allocated to the selected channel, displays a channel list including the empty channels which are not allocated to the internet addresses through the display unit, and provides the UI for entering the presently connected internet address in response to a selection of one of the empty channels.

2. The signal processing apparatus according to claim 1, further comprising a user input unit through which user's command for selecting the channel is input.

3. The signal processing apparatus according to claim 1, wherein the display unit displays the received contents.

4. The signal processing apparatus according to claim 3, further comprising an electronic program guide (EPG) generating unit which generates EPG information on the received contents,
wherein the control unit controls the display unit to display the EPG information generated by the EPG generating unit.

5. The signal processing apparatus according to claim 4, wherein the EPG information comprises brief information on the contents, and the control unit controls the display unit to display the EPG information generated by the EPG generating unit.

6. The signal processing apparatus according to claim 1, the internet address is provided in Really Simple Syndication format.

7. The signal processing apparatus according to claim 1, wherein the selected channel comprises at least one main channel and a plurality of sub channels sequentially arranged corresponding to the at least one main channel,
wherein the control unit allocates internet addresses, provided by an internet address which is allocated to the at least one main channel, to the plurality of sub channels to be stored in the memory unit.

8. The signal processing apparatus according to claim 7, wherein each of the plurality of sub-channels provides moving pictures included in the received contents of the selected channel.

9. The signal processing apparatus according to claim 8, wherein the control unit allocates to one of the plurality of sub channels an internet address which continuously displays the contents allocated to the remaining sub channels.

10. A signal processing system comprising:
a signal processing apparatus which comprises:
a memory unit in which a plurality of channels and internet addresses corresponding to the channels are stored,
a network connecting unit which is connectable to the internet,
a control unit which controls the network connecting unit to connect to an internet address corresponding to a channel selected by a user and to receive content provided from the internet address,
a user interface (UI) generating unit which generates a UI which comprises a menu for selecting empty channels among the plurality of channels and a menu for selecting a presently connected internet address, and a display unit which displays the generated UI; and a server which allocates an internet address selected by the user to the channel selected by the user among the plurality of channels, stores the internet address in the memory unit, and changes the channels stored in the memory unit and the internet addresses corresponding to the channels according to a selection by the user, wherein the server stores in the memory unit the channel and the internet address allocated to the selected channel, displays a channel list including the empty channels which are not allocated to the internet addresses through the display unit, and provides the UI for entering the presently connected internet address in response to a selection of one of the empty channels.

11. The signal processing system according to claim 10, further comprising an electronic program guide (EPG) generating unit which generates EPG information on the received content;

wherein the content comprises metadata; and wherein the electronic program guide (EPG) generating unit generates the EPG information based on the metadata.

12. The signal processing system according to claim 10, wherein the selected channel comprises at least one main channel and a plurality of sub channels sequentially arranged corresponding to the at least one main channel, wherein the control unit allocates internet addresses, provided by an internet address which is allocated to the at least one main channel, to the plurality of sub channels to be stored in the memory unit.

13. The signal processing apparatus according to claim 12, wherein each of the plurality of sub-channels provides moving pictures included in the received contents of the selected channel.

14. A control method of a signal processing apparatus which comprises a memory unit in which a plurality of channels and internet addresses corresponding to the channels are stored, the control method comprising:

allocating an internet address selected by a user to a channel selected by the user among the plurality of channels;

storing the internet address in the memory unit;

selecting the channel;

accessing to an internet address corresponding to the selected channel; and receiving contents provided from the internet address, wherein storing the internet address comprises changing the channels stored in the memory unit and the internet addresses corresponding to the channels according to a selection by a user, wherein the selecting the channel comprises displays a channel list including empty channels which are not allocated to the internet addresses among the plurality of channels, a selection of one of the empty channels and providing a user interface (UI) for selecting a presently connected internet address.

15. The control method according to claim 14, further comprising:

displaying the received contents.

16. The control method according to claim 14, further comprising:

generating electronic program guide (EPG) information on the contents; and displaying the generated EPG information.

17. The control method according to claim 16, wherein the EPG information comprises brief information on the contents, the control method further comprising: displaying the brief information on the content selected by the user on a sub screen.

18. The control method according to claim 14, wherein the selected channel comprises at least one main channel and a plurality of sub channels sequentially arranged corresponding to the at least one main channel, wherein internet addresses, provided by an internet address which is allocated to the at least one main channel, are allocated to the plurality of sub channels to be stored in the memory unit.

19. The control method according to claim 18, wherein an internet address for continuously displaying contents allocated to the remaining sub channels is allocated to one of the plurality of sub channels is allocated.

20. The signal processing apparatus according to claim 16, wherein the contents comprise metadata; and wherein the electronic program guide (EPG) generating unit generates the EPG information based on the metadata.

21. The control method according to claim 18, wherein each of the plurality of sub-channels provides moving pictures included in the received contents of the selected channel.

* * * * *